United States Patent [19]

Hansen

[11] Patent Number: 4,822,446

[45] Date of Patent: Apr. 18, 1989

[54] APPARATUS FOR REINFORCING BINDING HOLES

[76] Inventor: Robert S. Hansen, P.O. Box 2238, Rohnert Park, Calif. 94928

[21] Appl. No.: 922,406

[22] Filed: Oct. 23, 1986

[51] Int. Cl.[4] .............................................. B32B 31/18

[52] U.S. Cl. .................................... 156/513; 156/250; 156/252; 156/514; 156/530; 206/820; 83/922

[58] Field of Search ............... 156/513, 514, 530, 250, 156/252; 83/176, 922; 206/526, 620, 820

[56] References Cited

U.S. PATENT DOCUMENTS

| | | | |
|---|---|---|---|
| 1,869,385 | 8/1932 | Maish | 428/43 |
| 2,437,640 | 3/1948 | Hedrick | 206/820 |
| 2,561,387 | 7/1951 | Lo Forese | 156/514 |
| 2,589,168 | 3/1952 | Vassar | 206/820 |
| 2,764,501 | 9/1956 | Perri | 206/820 |
| 3,441,462 | 4/1969 | Bogen et al. | 156/513 |
| 3,467,250 | 9/1969 | D'Elia et al. | 206/820 |

FOREIGN PATENT DOCUMENTS

| | | | |
|---|---|---|---|
| 1248567 | 11/1960 | France | 156/514 |

*Primary Examiner*—Caleb Weston
*Attorney, Agent, or Firm*—Flehr, Hohbach, Test, Albritton & Herbert

[57] ABSTRACT

Reinforcement for strengthening sheets of paper and the like around binding holes. The reinforcement has a generally chevron shape with parallel opposing edges of similar length and contour. In one embodiment, the reinforcements are supplied in a precut from in which a plurality of the reinforcements are nested together along an axis with the opposing edges of adjacent ones of the reiforcements in close mating relationship with each other and no gaps or waste material between the reinforcements. In another embodiment, the reinforcements are cut in place from a sheet of adhesive backed reinforcing material and applied by a punch which also cuts the binding holes in the paper.

8 Claims, 1 Drawing Sheet

Fig. 1
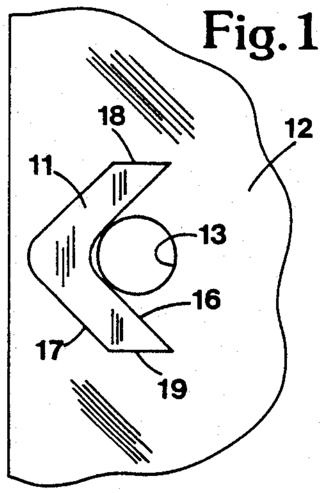
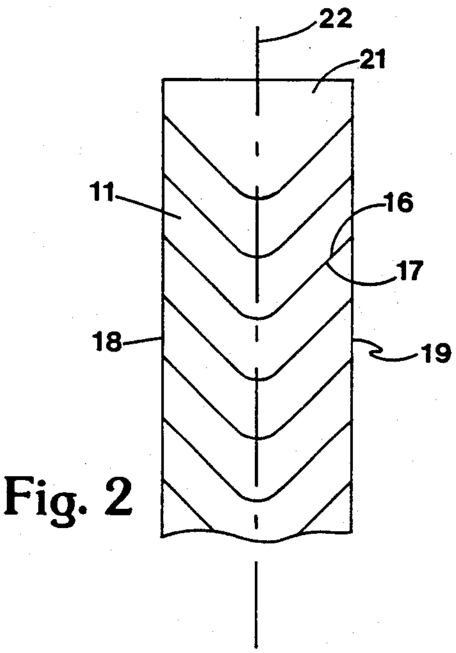
Fig. 2
Fig. 3
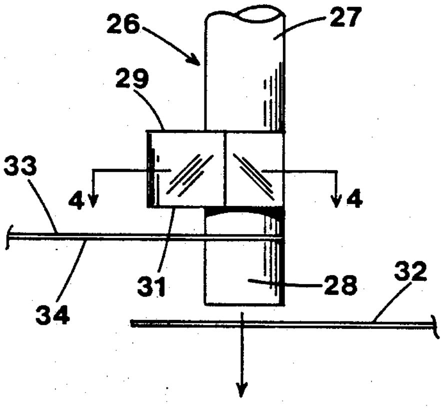
Fig. 4
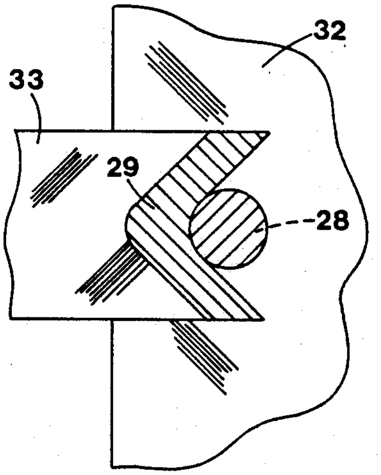

APPARATUS FOR REINFORCING BINDING HOLES

This inventio pertains generally to the reinforcement of sheets of paper and the like to prevent tearing around binding holes, and more particularly to an improved reinforcement, method and apparatus for applying the same.

The most common reinforcements heretofore provided for preventing sheets of paper and the like from tearing around binding holes are circular rings of tear resistant material which are applied to one or both surfaces of the sheets around the holes. At one time, such rings were cut from a gummed sheet material such as fabric and packaged in a small box. U.S. Pat. No. 1,869,385 shows a supply of such reinforcements joined together at their edges for easier packaging and use. U.S. Pat. No. 2,437,640 shows a strip of C-shaped reinforcements which could be applied to the sheets in a binder without opening the rings or removing the sheets from the binder. U.S. Pat. No. 2,589,168 shows U-shaped reinforcements in strips or sheets in which the reinforcements are arranged in oppositely facing rows with the arms of the U-shaped reinforcements in the two rows being interleaved.

More recently, reinforcements have been fabricated of plastic materials with pressure sensitive adhesives on one side thereof. These reinforcements have been supplied on backing sheets or strips and peeled therefrom for use.

One example of such reinforcements is found in U.S. Pat. No. 2,764,501 which also shows a strip of generally square reinforcements formed as a roll with perforations between the reinforcements to permit them to be torn off individually.

It is in general an object of the invention to provide a new and improved reinforcement, method and apparatus for applying the same.

Another object of the invention is to provide a reinforcement of the above character which can be supplied in a precut form or can be cut in place as it is applied.

Another object of the invention is to provide a reinforcement of the above character which utilizes substantially all of the sheet material from which it is cut.

These and other objects are achieved in accordance with the invention by providing a reinforcement having a generally chevron shape with parallel opposing edges of similar length and contour. In one embodiment, the reinforcements are supplied in a precut form in which a plurality of the reinforcements are nested together along an axis with the opposing edges of adjacent ones of the reinforcements in close mating relationship with each other and no gaps or waste material between the reinforcements. In another embodiment, the reinforcements are cut in place from a sheet of adhesively backed reinforcement material and applied by a punch which also cuts the binding holes in the paper to be reinforced.

FIG. 1 is a fragmentary plan view of a sheet of paper with a reinforcement embodying the invention applied thereto.

FIG. 2 is a plan view of a sheet of reinforcements according to the invention.

FIG. 3 is a side elevational view of one embodiment of a punch for cutting and applying reinforcements according to the invention.

FIG. 4 is a cross-sectional view taken along line 4—4 in FIG. 3.

In FIG. 1, the reinforcement 11 is illustrated in connection with a sheet of paper 12 having a binding hole 13 punched or otherwise formed therein. The reinforcement comprises a generally chevron shaped strip having parallel opposing edges of similar length and contour. More specifically, the chevron shaped strip has an inner edge 16 and an outer edge 17 of equal length and identical generally V-shaped contour. The side edges 18, 19 of the chevron shaped strip are straight and parallel to each other. The reinforcement is positioned on the sheet of paper with its concave inner edge 16 adjacent to the binding hole and its convex outer edge 17 facing toward the edge of the paper.

In the embodiment illustrated, inner and outer edges 16, 17 are rounded at their vertice with a contour corresponding to the binding hole, the radius of curvature preferably being equal to or slightly greater than the radius of the binding hole. In this embodiment, the curved central portion of the edges has an arc length on the order of 90°, and the outer portions of the edges extend tangentially from the central portions at an angle on the order 90° with respect to each other. The side arm portions of the strip are of such length that the outer ends of inner edge 16 extend to the side of the binding hole opposite the vertex of the strip.

The reinforcement is fabricated of a tear resistant material such as a plastic which resists tearing and wear of the paper around the binding hole, and it has an adhesive on its underside or back side for affixing the chevron shaped strip to the paper. The reinforcements are conveniently cut from a sheet of material having an adhesive coating on the underside thereof. Since the opposing edges of the chevron shaped strips are identical in length and contour, the strips can be cut from adjacent positions on the sheet material with no gaps or waste material between the strips.

FIG. 2 shows a supply of the reinforcements 11 on a backing sheet 21. The reinforcements are held on the backing sheet by their adhesive, and they are peeled from the sheet for use. The reinforcements are nested together along an axis 22, with the inner edge 16 of one reinforcement interfitting closely with the outer edge 17 of the adjacent reinforcement. There are no gaps or waste material between the adjacent reinforcements. The side edges 18, 19 are aligned along straight lines generally parallel to axis 22, and rows of the reinforcements can be positioned side-by-side with no gaps or waste material between them.

As illustrated in FIG. 3, the chevron shaped reinforcements can be cut in place and applied to a sheet of paper by a punch 26. This punch also cuts the binding hole in the paper. The punch comprises an axially movable punch element 27 which has a binding hole cutter 28 at the distal end thereof and a reinforcement cutter 29 displaced axially from the binding hole cutter. These cutters have cross-sectional shapes corresponding to the binding hole and the chevron shaped reinforcement, respectively, and they cooperate with matching dies (not shown) to cut the paper and the reinforcing material. The reinforcement cutter has a flat lower surface 31 which presses the reinforcement against the paper after it is cut from the reinforcement stock.

In use, punch 26 is positioned above the sheet of paper 32 to be punched and reinforced, with binding hole cutter 28 aligned with the point at which the binding hole is to be punched and reinforcement cutter 29 aligned with the area in which the reinforcement is to be applied. A sheet of tear resistant material 33 having adhesive coating on its underside is positioned beneath the reinforcement cutter. As the punch element is depressed, cutter 28 punches the binding hole in the paper, and cutter 29 cuts the chevron shaped reinforcement from the adhesively backed sheet. As the punch continues its downward travel, the newly cut reinforcement is beneath the lower surface of the reinforcement cutter and is pressed against the paper next to the binding hole. To punch and reinforce another hole, the punch is repositioned where the hole is to be formed, the reinforcement stock is advanced, and the punch element is once again depressed.

The invention has a number of important features and advantages. The unique chevron shape of the reinforcement permits a plurality of reinforcements to be cut from a sheet of material with no waste between the reinforcements. Reinforcements can be suppled in a precut form on a backing sheet with no gaps between adjacent reinforcements, and they can also be cut in place and applied in a single operation.

It is apparent from the foregoing that a new and improved reinforcement, method and apparatus have been provided. While only certain presently preferred embodiments have been described in detail, as will be apparent to those familiar with the art, certain changes and modifications can be made without departing from the scope of the invention as defined by the following claims.

I claim:

1. Apparatus for reinforcing binding holes in paper, comprising a sheet of reinforcing material, a punch having a pair of substantially identical V-shaped cutting edges which are spaced apart and parallel to each other for cutting the reinforcing material along V-shaped lines to form a chevron shaped reinforcement having concave and convex edges of substantially identical length and contour on opposite sides thereof, and means forming a part of the punch for applying the chevron shaped reinforcement to the paper with the concave edge adjacent to a binding hole.

2. The apparatus of claim 1 wherein the V-shaped cutting edges are rounded at their vertices.

3. The apparatus of claim 2 wherein the rounded vertices have a radius of curvature approximately equal to the radius of the binding holes and an arc length on the order of 90 degrees.

4. The apparatus of claim 1 wherein the sheet of reinforcing material comprises an elongated strip having parallel side edges, and the V-shaped lines along which the sheet is cut extend between the side edges.

5. The apparatus of claim 1 wherein the punch includes a cutter for forming the binding hole in the paper adjacent to the concave edge of the reinforcement as the reinforcement is applied to the paper.

6. The apparatus of claim 1 wherein the sheet of reinforcing material has an adhesive on one side thereof for affixing the reinforcement to the paper.

7. In apparatus for cutting binding hole reinforcements from an elongated strip of reinforcing material having parallel side edges: a punch having a V-shaped cutting edge for cutting the strip of reinforcing material along successive V-shaped lines which are spaced apart along the length of the strip and extend between the side edges of the strip to form chevron shaped reinforcements having concave and convex edges of substantially identical length and contour on opposite sides thereof with no waste between the adjoining concave and convex edges of the reinforcements which are cut successively from the strip.

8. The apparatus of claim 7 wherein the V-shaped cutting edge is rounded at its vertex.

* * * * *